United States Patent
Fang et al.

(10) Patent No.: US 12,429,715 B2
(45) Date of Patent: Sep. 30, 2025

(54) SYNTHESIS AND APPLICATION OF LIGHT MANAGEMENT WITH THERMOCHROMIC HYDROGEL MICROPARTICLES

(71) Applicants: MASSACHUSETTS INSTITUTE OF TECHNOLOGY, Cambridge, MA (US); University of Hong Kong, Hong Kong (HK)

(72) Inventors: Nicholas Fang, Lexington, MA (US); Xinhao Li, Beijing (CN); Chang Liu, North Point (HK); Shien-Ping Feng, New Territories (HK)

(73) Assignees: Massachusetts Institute of Technology, Cambridge, MA (US); University of Hong Kong, Hong Kong (HK)

( * ) Notice: Subject to any disclaimer, the term of this patent is extended or adjusted under 35 U.S.C. 154(b) by 999 days.

(21) Appl. No.: 17/287,651

(22) PCT Filed: Nov. 6, 2019

(86) PCT No.: PCT/US2019/060002
§ 371 (c)(1),
(2) Date: Apr. 22, 2021

(87) PCT Pub. No.: WO2020/097163
PCT Pub. Date: May 14, 2020

(65) Prior Publication Data
US 2021/0373361 A1    Dec. 2, 2021

Related U.S. Application Data

(60) Provisional application No. 62/756,260, filed on Nov. 6, 2018.

(51) Int. Cl.
*G02F 1/00* (2006.01)
*C08J 3/075* (2006.01)
(Continued)

(52) U.S. Cl.
CPC ............ *G02F 1/0063* (2013.01); *C08J 3/075* (2013.01); *C08L 33/10* (2013.01); *C08L 33/26* (2013.01);
(Continued)

(58) Field of Classification Search
CPC .... B32B 17/068; C08G 2261/56; C08J 3/075; C08J 2333/10; C08J 2333/26;
(Continued)

(56) References Cited

U.S. PATENT DOCUMENTS

| 8,884,156 B2 | 11/2014 | Schmaelzle et al. |
| 2006/0128916 A1 | 6/2006 | Schrod |

(Continued)

FOREIGN PATENT DOCUMENTS

| CN | 103507389 A | 1/2014 |
| WO | 2015139852 A1 | 9/2015 |

OTHER PUBLICATIONS

Dubey, Smart hydrogels based platforms for investigation of biochemical reactions, Core.AC.UK, Technical University of Dresden, Aug. 20, 2015, 1-165.*

(Continued)

*Primary Examiner* — Travis S Fissel
*Assistant Examiner* — Daniel J. Jordan
(74) *Attorney, Agent, or Firm* — Gesmer Updegrove LLP

(57) ABSTRACT

Intelligent control of solar transmission through windows promises to reduce energy consumption for thermal comfort in buildings. However, the ability of current smart windows to regulate solar gain based on tunable extinction of phase-change materials is not optimum. A thin-film thermochromic device based on tunable light scattering of hydrogel microparticles of prescribed diameters is reported. In the study, poly (N-isopropylacrylamide)-2-Aminoethylmethacrylate hydrochloride (pNIPAm-AEMA) microparticles are (Continued)

synthesized, with low phase transition temperature ~32° C. Notably, the average size of pNIPAm-AEMA particles can vary from 1388 nm at 25° C. to 546 nm at 35° C., leading to unprecedented infrared transmittance modulation of 75.6%, in agreement with the numerical simulation based on Mie theory. A high luminous transmittance of 87.2% is accomplished. The pNIPAm-AEMA device demonstrates tunable scattering with excellent stability and scalability, which may find application in a broader field of light management beyond energy-saving smart windows.

11 Claims, 12 Drawing Sheets

(51) Int. Cl.
    *C08L 33/10*     (2006.01)
    *C08L 33/26*     (2006.01)
    *G02F 1/01*     (2006.01)

(52) U.S. Cl.
    CPC ............ *G02F 1/009* (2013.01); *G02F 1/0147* (2013.01); *C08J 2333/10* (2013.01); *C08J 2333/26* (2013.01)

(58) Field of Classification Search
    CPC .. C08L 33/10; C08L 33/26; E06B 2009/2405; E06B 9/24; G02F 1/0063; G02F 1/009; G02F 1/0147
    USPC ................ 359/237, 288, 452, 614, 884, 885
    See application file for complete search history.

(56) References Cited

U.S. PATENT DOCUMENTS

2015/0130012 A1    5/2015    Jun et al.
2018/0004018 A1    1/2018    Oron et al.

OTHER PUBLICATIONS

Jones et al., Synthesis and Characterization of Multiresponsive Core-Shell Microgels, Macromolecules, Oct. 1, 2000, vol. 33, Issue 22, 8301-8306.*
Search Report issued on Jun. 29, 2023 in related Chinese Patent Application No. 201980071965.0.
Office Action issued by Chinese Patent Office dated Jul. 1, 2023 in related Chinese Patent Application No. 201980071965.0.
Tim Still et al., Temperature-Sensitive Hydrogel-Particle Films from Evaporating Drops, Adv. Mater. Interfaces 2015, pp. 1-7.
Notice of Allowance issued by Chinese Patent Office dated Feb. 20, 2024 in related Chinese Patent Application No. 201980071965.0.
International Preliminary Report on Patentability issued on May 11, 2021 in related PCT Application No. PCT/US2019/016002.
International Search Report and Written Opinion issued on Feb. 13, 2020 in related PCT Application No. PCT/US19/60002.
Zhou et al., Temperature-Responsive Hydrogel with Ultra-Large Solar Modulation and High Luminous Transmission for "Smart Window" Applications, Journal of Materials Chemistry, A 2, (2014),13550-13555.
Lee et al., A Dual-Responsive Nanocomposite Toward Climate-Adaptable Solar Modulation for Energy-Saving Smart Windows, ACS Applied Materials & Interfaces 9, (2017), 6054-6063.
Zhou et al.,VO 2/Hydrogel Hybrid Nanothermochromic Material with Ultra-High Solar Modulation and Luminous Transmission, Journal of Materials Chemistry, A 3, (2015), 1121-1126.
Acciaro et al., Preparation of Monodisperse Poly (N-isopropylacrylamide) Microgel Particles with Homogenous Cross-Link Density Distribution, Langmuir 27, (2011), 7917-7925.
Still et al., A. Synthesis of Micrometer-Size Poly (N-isopropylacrylamide) Microgel Particles with Homogeneous Crosslinker Density and Diameter Control, Journal of Colloid and Interface Science, 405, (2013), 96-102.
Hu et al., Synthesis and Physicochemical Properties of Cationic Microgels Based on Poly(N-isopropylmethacrylamide), Colloid Polym Sci., Dec. 4, 2010; 289(3): 333-339.
Deng et al., Synthesis and Characterization of a Novel temperature-pH Responsive Copolymer of 2-Hydroxypropyl Acrylate and Aminoethyl Methacrylate Hydrochloric Salt, eXpress Polymer Letters, vol. 3, No. 2 (2009) 97-104.
Hsu et al., Transparent Displays Enabled by Resonant Nanoparticle Scattering, Nature Communications, Jan. 21, 2014, 1-6.
Schittny, et al., Invisibility Cloaking in a Diffusive Light Scattering Medium, Sciencexpress, Jun. 5, 2014, 1-5.
Still et al., Temperature-Sensitive Hydrogel-Particle Films from Evaporating Drops, Advanced Materials Interfaces, Nov. 2015, vol. 2, No. 16.
Apte et al., Window-Related Energy Consumption in the US residential and Commercial Building Stock, Lawrence Berkeley National Laboratory, May 8, 2005, 1-39.
Runnerstrom et al., Nanostructured Electrochromic Smart Windows: Traditional Materials and NIR-Selective Plasmonic Nanocrystals, Chemical Communications 50, Jun. 14, 2014, 10555-10572.
Kamalisarvestani et al., Performance, Materials and Coating Technologies of Thermochromic Thin Films on Smart Windows, Renewable and Sustainable Energy Reviews 26, May 20, 2013, 353-364.
Chen et al., Fine Crystalline VO 2 Nanoparticles: Synthesis, Abnormal Phase Transition Temperatures and Excellent Optical Properties of a Derived VO 2 Nanocomposite Foil, Journal of Materials Chemistry A2, Jan. 2014.
Zhang et al., Solution-based fabrication of vanadium dioxide on F: SnO 2 substrates with largely enhanced thermochromism and low-emissivity for energy-saving applications, Energy & Environmental Science 4, Jul. 11, 2011, 1-8.
Chen et al., VO-2 Based Double-Layered Films for Smart Windows: Optical Design, All-Solution Preparation and Improved Properties, Solar Energy Materials and Solar Cells 95, May 20, 2011, 2677-2684.
Ruan et al., Superscattering of Light from Subwavelength Nanostructures, Physical Review Letters 105, Jul. 2, 2010, 013901-1-013901-4.
Ramella-Roman et al., Three Monte Carlo Programs of Polarized Light Transport into Scattering Media: Part I., Optics Express 13, Jun. 13, 2005, 4420-4438.
Teraoka, Polymer Solutions, John Wiley & Sons, Inc., 2002, 1-349.
Matzler, Matlab Functions for Mie Scattering and Absooption, Version 2, IAP Res. Rep 8, Aug. 2002, 1-24.
Ma et al., Determination of Complex Refractive Index of Polystyrene Microspheres from 370 to 1610 nm, Physics in Medicine and Biology 48, Dec. 5, 2003; 4165-4172.
Patent Certificate issued by Chinese Patent Office dated Apr. 30, 2024 in related Chinese Patent Application No. 201980071965.0.

\* cited by examiner

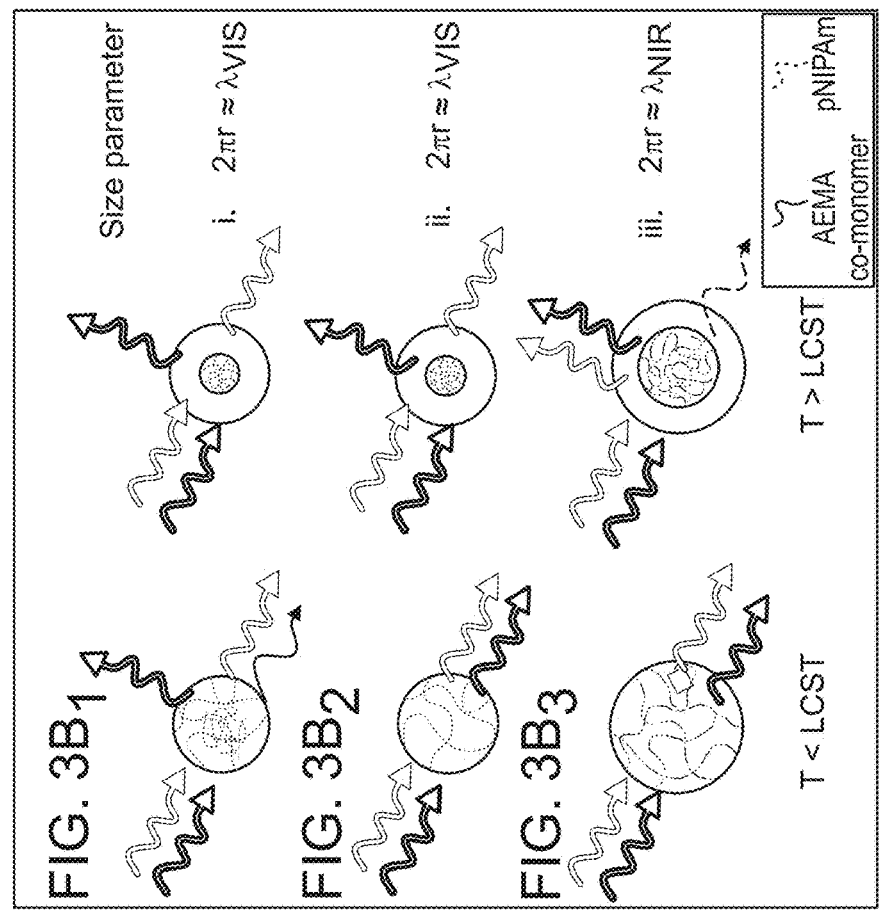
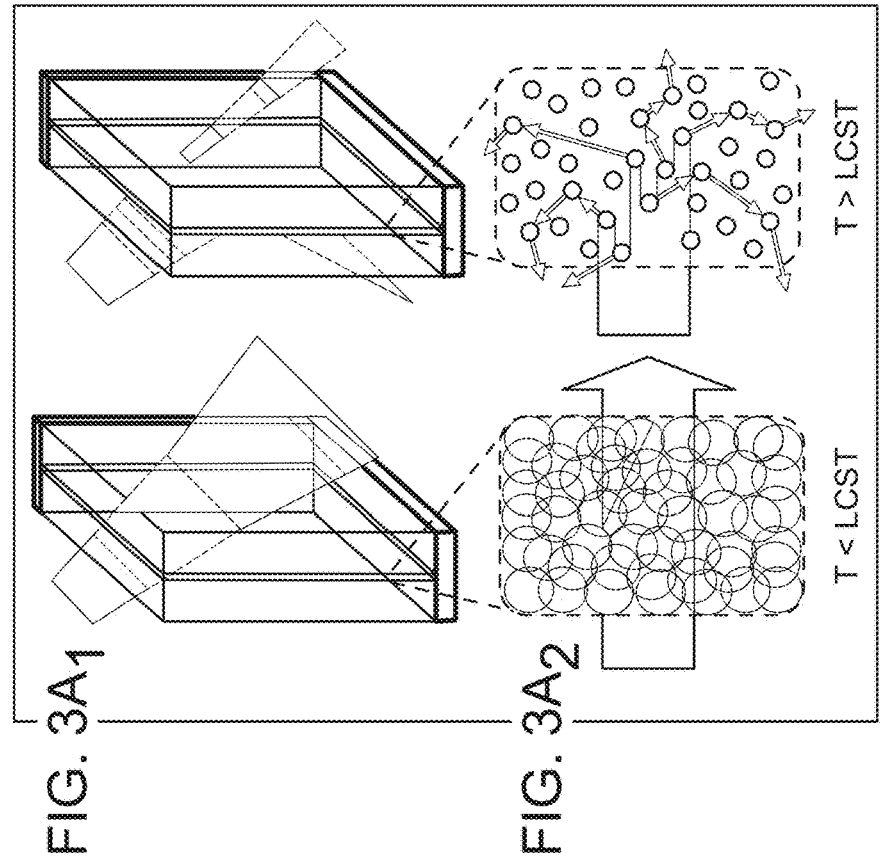

SYNTHESIS AND APPLICATION OF LIGHT MANAGEMENT WITH THERMOCHROMIC HYDROGEL MICROPARTICLES

RELATED INFORMATION

This application is a 371 of PCT Application No. PCT/US2019/60002 filed Nov. 6, 2019, which claims the benefit of provisional application 62/756,260 filed Nov. 6, 2018 their entire contents and substance of which are herein incorporated by reference.

BACKGROUND OF THE INVENTION

Field of Invention

The present invention relates generally to the field of thermochromic hydrogel microparticles. More specifically, the present invention is related to synthesis and application of light management with thermochromic hydrogel microparticles.

Discussion of Related Art

Considerable endeavors have been devoted to light management for energy-efficient buildings to reduce energy use in heating, ventilation and air conditioning (HVAC) systems, which account for 13% in 2006 and 10% in 2020 (projected) of the total energy consumption in the U.S. Light management using advanced smart window technologies is promising as it can theoretically lead to energy savings of more than $1.055 \times 10^{15}$ kJ (i.e., 1% of annual total energy consumption). Thermochromic and electrochromic materials have garnered the most attention for their intelligent regulation of solar-energy transmission. Previous transmittance modulation processes mainly rely on the change of the imaginary part of the refractive index, which invokes either reflection in thermochromic metal oxides or adsorption in electrochromic plasmonic nanocrystals. However, this reliance leads to scientific challenges in achieving a large tuning contrast of refractive index, a broad modulation spectrum and a near room-temperature transition at the same time. In practical terms, several critical claims for broad adaption in building technologies need to be addressed, such as luminous transparency, transmittance modulation efficiency, economical manufacture and operation, stability and scalability.

Thermochromic devices are often considered as autonomous systems with zero-energy input because the facade change is triggered by the temperature change of the environment. The superiority of the single-component structure holds promise in industrial production and ease of implementation. Alternatively, electrochromic devices achieve the dynamic modulation of transmittance over visible and infra-red (IR) regions via electrochemical charging and discharging in a complex electrochemical-cell structure where the fabrication of plasmonic nanocrystals relies on high-temperature thin-film deposition processes. A continuous power supply is required for operation. Taken together, costly production and durability concerns limit the scalability of electrochromic devices.

Conventional thermochromic devices are generally based on the change to the imaginary part of refractive index in the IR region. For example, vanadium dioxide ($VO_2$) varies from an IR transparent state to an IR reflective metallic state at critical temperature ($T_c$)~ 68° C. However, this process of transmittance modulation has two intrinsic limitations: 1) for $VO_2$ to be functionalized as a smart window coating, a transparent heating unit is needed, and the resulting elevated temperature of the window surface would diminish the heat-shielding ability. Some of the best-performance $VO_2$ devices in literature work at 90° C., showing a solar transmittance modulation ($\Delta T_{solar}$) of 22.3% with a luminous transmittance ($T_{lum}$) of 45.6%. Although dopants such as tungsten, niobium, and titanium have been used to reduce $T_c$, the introduction of foreign ions will induce degradations in $\Delta T_{solar}$ and $T_{lum}$, the strong inner-band and inter-band adsorption of $VO_2$ lies in the visible region, leading to reduced $T_{lum}$. Strategies like fluorine doping, anti-reflective coating, and porosity tuning are insufficient to improve the $T_{lum}$ by only 10% while sacrificing the $\Delta T_{solar}$ inevitably. Furthermore, doping and microscopic structure fabrications noticeably increase the complexity and cost of manufacturing. Current techniques to conquer the preceding obstacles in conventional thermochromic windows are still far from optimum.

Embodiments of the present invention are an improvement over prior art systems and methods.

SUMMARY OF THE INVENTION

In one embodiment, the present invention provides a hydrogel thin-film device for use in light management, the device comprising: a layer comprising temperature-responsive hydrogel microparticles, the temperature-responsive hydrogel microparticles comprising poly (N-isopropylacrylamide)-2-Aminoethylmethacrylate hydrochloride (pNIPAm-AEMA) microparticles, wherein solar gain is regulated in the device by tuning light scattering in the layer by controlling particle size of the pNIPAm-AEMA microparticles.

In another embodiment, the present invention provides a hydrogel thin-film device for use in light management, the device comprising: a layer comprising temperature-responsive hydrogel microparticles, the temperature-responsive hydrogel microparticles comprising poly (N-isopropylacrylamide)-2-Aminoethylmethacrylate hydrochloride (pNIPAm-AEMA) microparticles, wherein solar gain is regulated in the device by tuning light scattering in the layer by controlling particle size of the pNIPAm-AEMA microparticles, and wherein an average size of the pNIPAm-AEMA microparticles varies from 1388 nm at 25° C. to 546 nm at 35° C.

In yet another embodiment, the present invention provides a hydrogel thin-film device for use in light management, the device comprising: a layer comprising temperature-responsive hydrogel microparticles, the temperature-responsive hydrogel microparticles comprising poly (N-isopropylacrylamide)-2-Aminoethylmethacrylate hydrochloride (pNIPAm-AEMA) microparticles, wherein solar gain is regulated in the device by tuning light scattering in the layer by controlling particle size of the pNIPAm-AEMA microparticles, and wherein the temperature-responsive hydrogel microparticles can undergo a phase transition under solar irradiance due to the low critical solution temperature (LCST) at 32° C.

In one embodiment, the infra-red (IR) transmittance modulation of the above-mentioned devices is between 34° C. and 40° C. is over 70%.

In one embodiment, the IR transmittance modulation of the above-mentioned devices is between 34° C. and 40° C. is 75.6%.

In one embodiment, the luminous transmittance of the above-mentioned devices is over 85% at a phase transition temperature of about 32° C.

In one embodiment, the above-mentioned devices may be used as part of any of the following: a smart window, an optical modulator, a display, and an invisibility cloaking device.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. $3A_1$-$A_2$ depict a schematic of transmittance modulation based on the tunable scattering behaviors of hydrogel particles.

FIG. $3B_1$ depicts light manipulation with the aid of the phase transition of pNIPAm particles produced by one-pot synthesis.

FIG. $3B_2$ depicts pNIPAm particles synthesized by the continuous feeding method.

FIG. $3B_3$ depicts pNIPAm-AEMA co-polymerized microparticles.

Figure 3C:
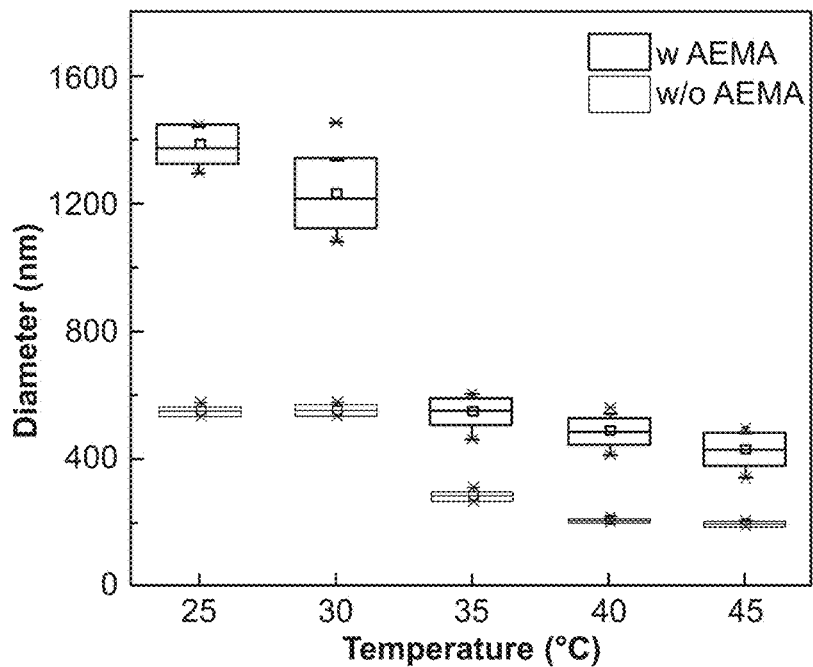
Figure 3C:
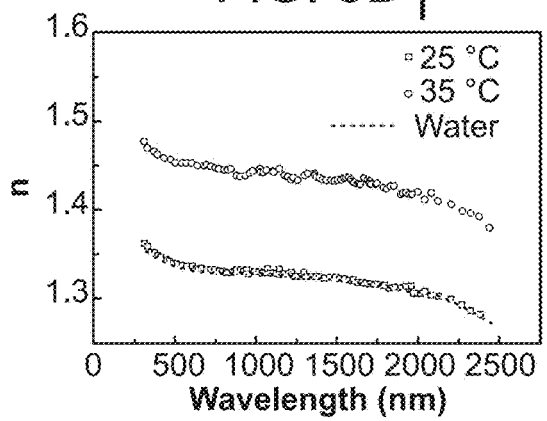
Figure 3C:
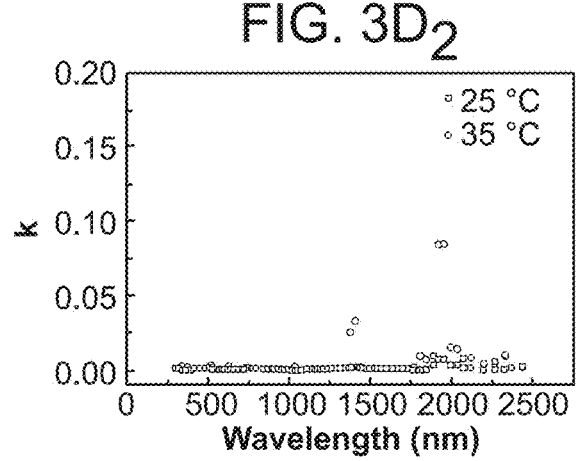
Figure 3C:
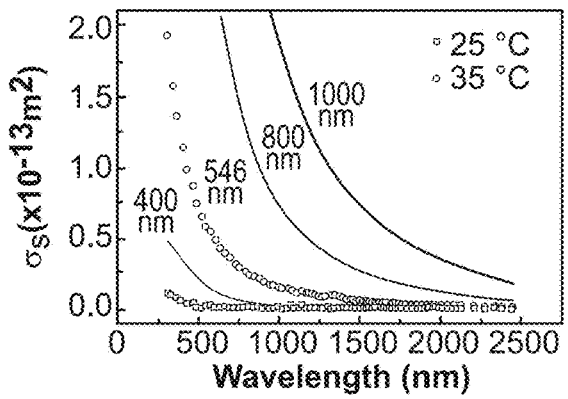
Figure 3C:
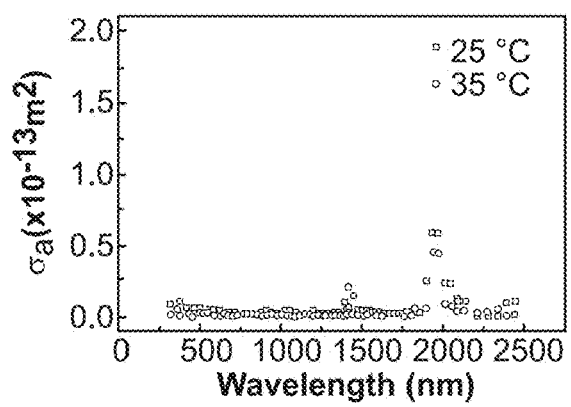

FIG. 3C depicts hydrodynamic diameters (in nm) of pNIPAm-AEMA microparticles (solid lines) and pNIPAm particles (dashed lines) at different temperatures.

FIGS. $3D_1$ and $3D_2$ depict Real (n) and imaginary (k) refractive index of the pNIPAm-AEMA microparticles at 25° C. and 35° C., respectively. The dashed line in D1 shows the n of water.

FIGS. $3D_3$ and $3D_4$ depict corresponding scattering and absorbing cross-sections of the pNIPAm-AEMA microparticles at 25° C. and 35° C., respectively. Estimated scattering cross-sections of pNIPAm-AEMA with a diameter of 400 nm, 800 nm and 1000 nm at the de-swollen state are illustrated as solid curves.

Figure 4:
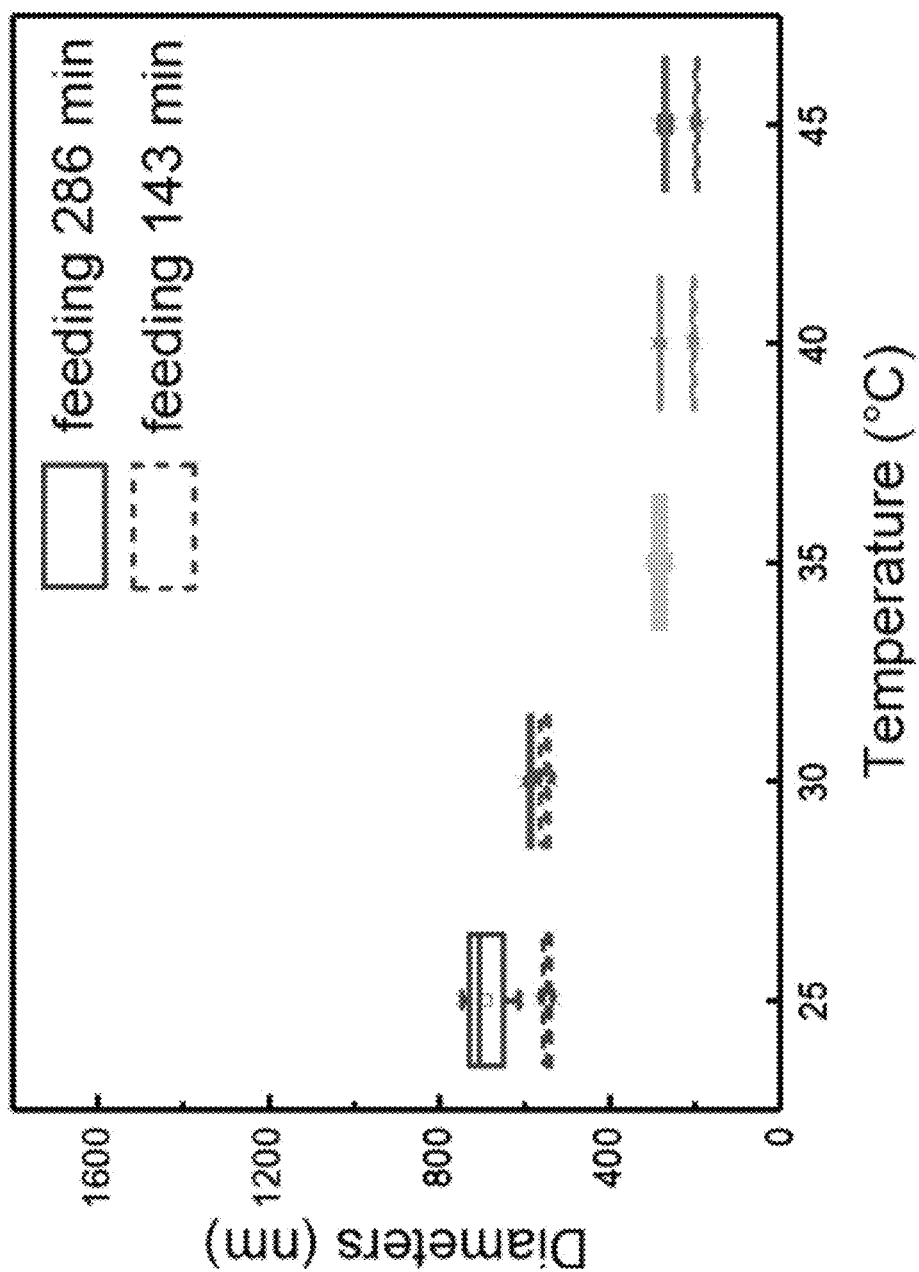

FIG. 4 illustrates the size limitation of pNIPAm particles synthesized by continuous feeding method.

Figure 5C:
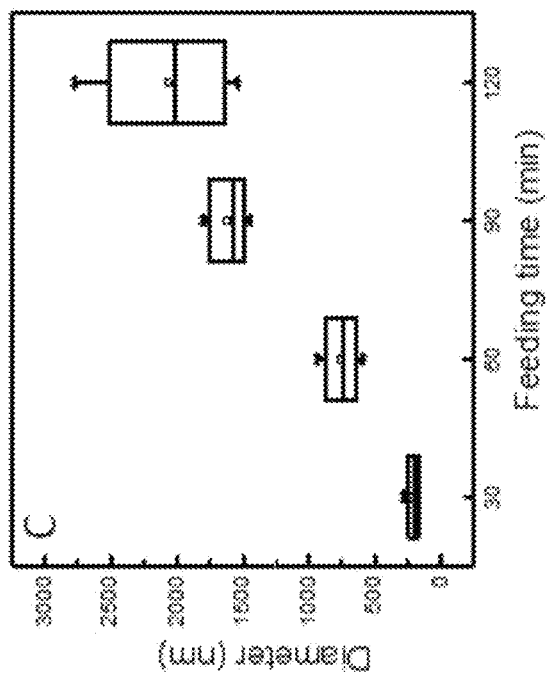
Figure 5B:
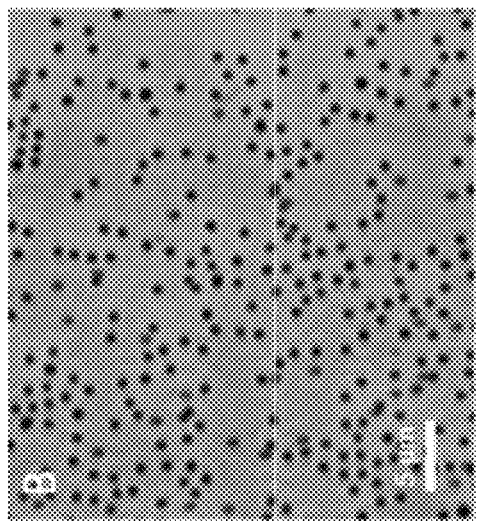
Figure 5A:
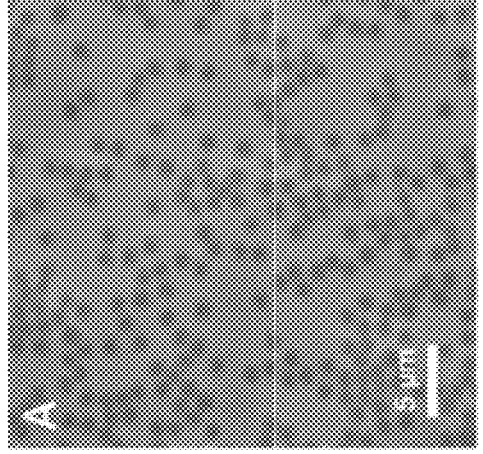

FIGS. 5A-B depict optical microscope images of the pNIPAm-AEMA microparticles synthesized by continuous feeding for 75 min.

FIG. 5C depicts hydrodynamic diameter of the co-polymerized pNIPAm-AEMA particles at 25° C.

Figures 6A, 6B:
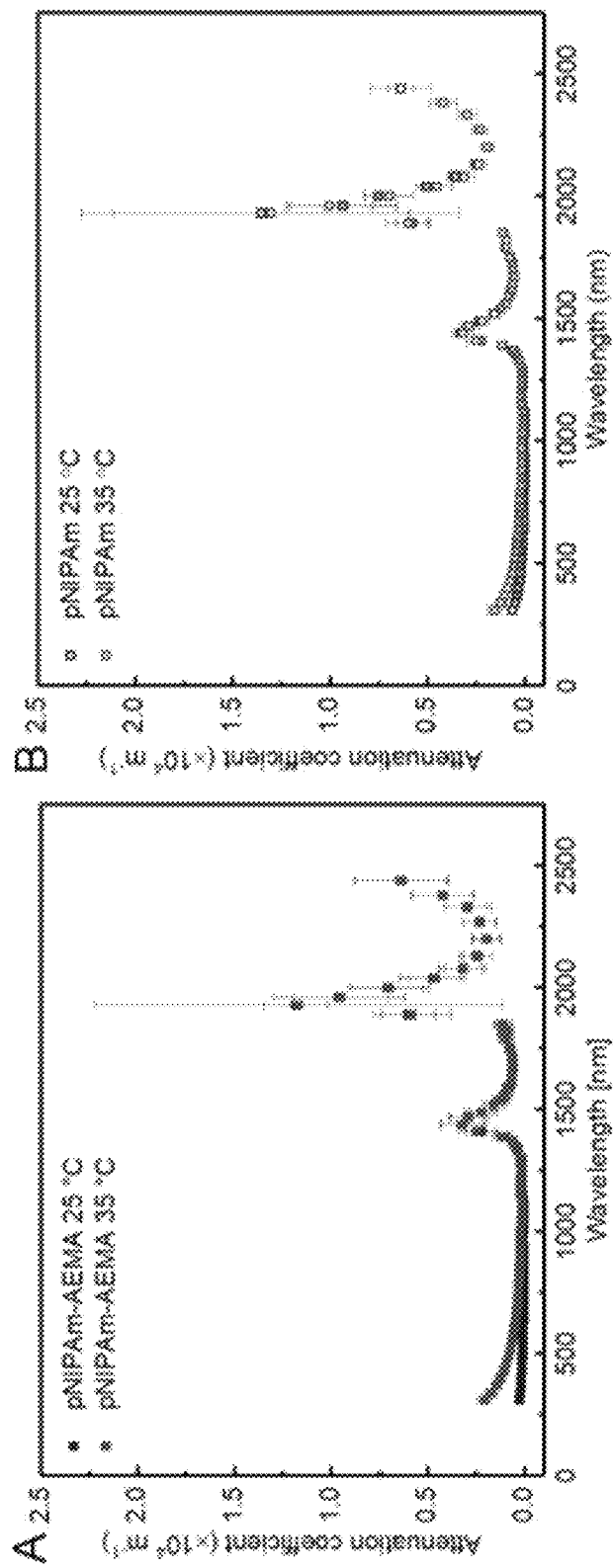

FIGS. 6A-B depict attenuation coefficient of hydrogel particle suspension.

Figure 7B:
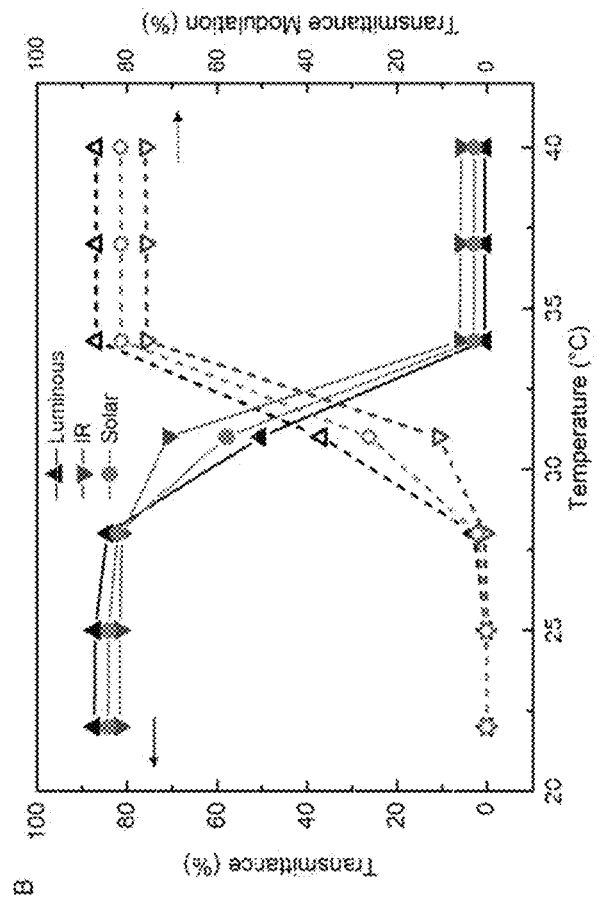
Figure 7A:
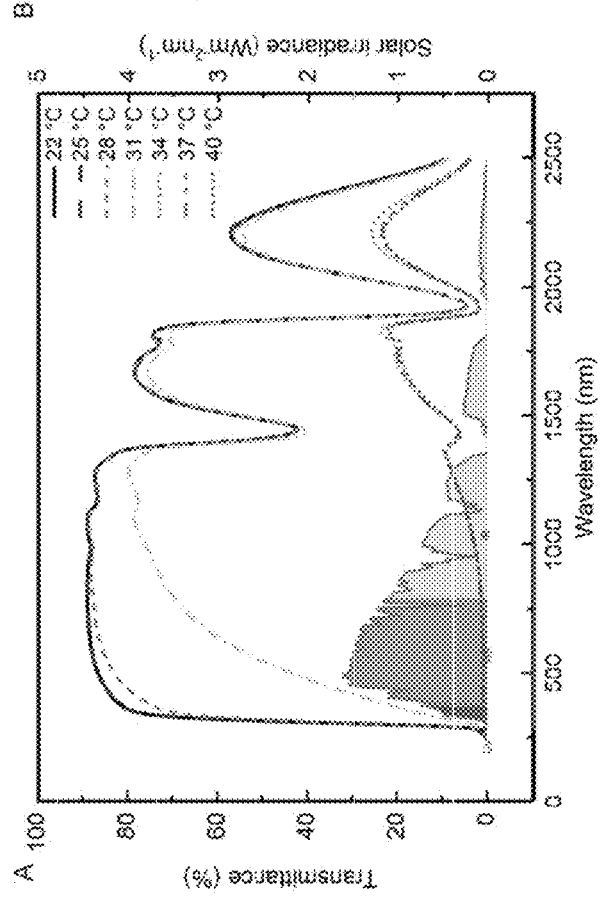

FIGS. 7A-B depict the transmittance spectra (250-2500 nm) at the layer thickness of 240 m. FIG. 7B shows luminous ($\Delta T_{lum}$), IR ($\Delta T_{IR}$) and solar ($\Delta T_{solar}$) transmittance modulations at different temperatures.

FIGS. 8A-D illustrate transmittance modulation by pNIPAm-AEMA and pNIPAm hydrogel with different layer thicknesses.

Figures 9A, 9B:
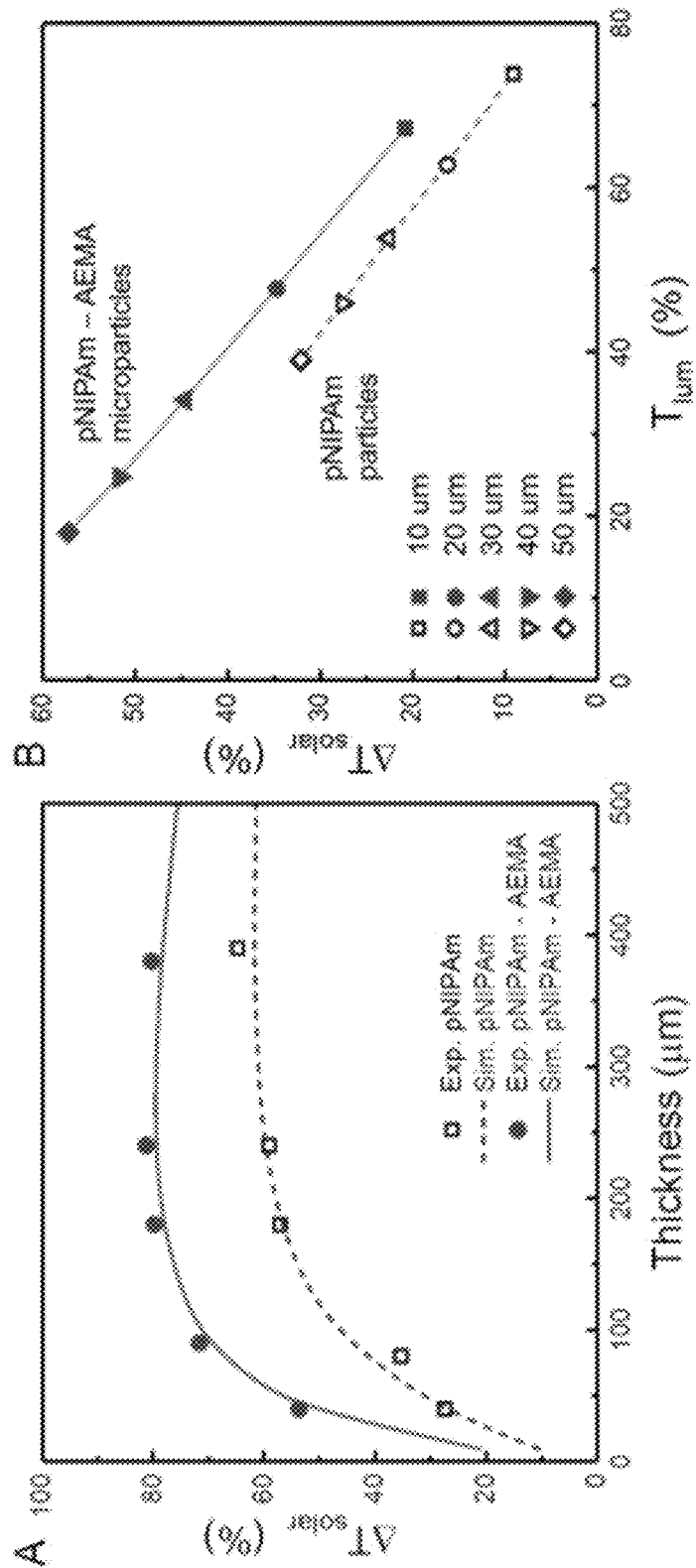

FIGS. 9A-B depict graphs showing thickness-dependent thermochromic properties of pNIPAm-AEMA and pNIPAm hydrogel.

Figure 10:
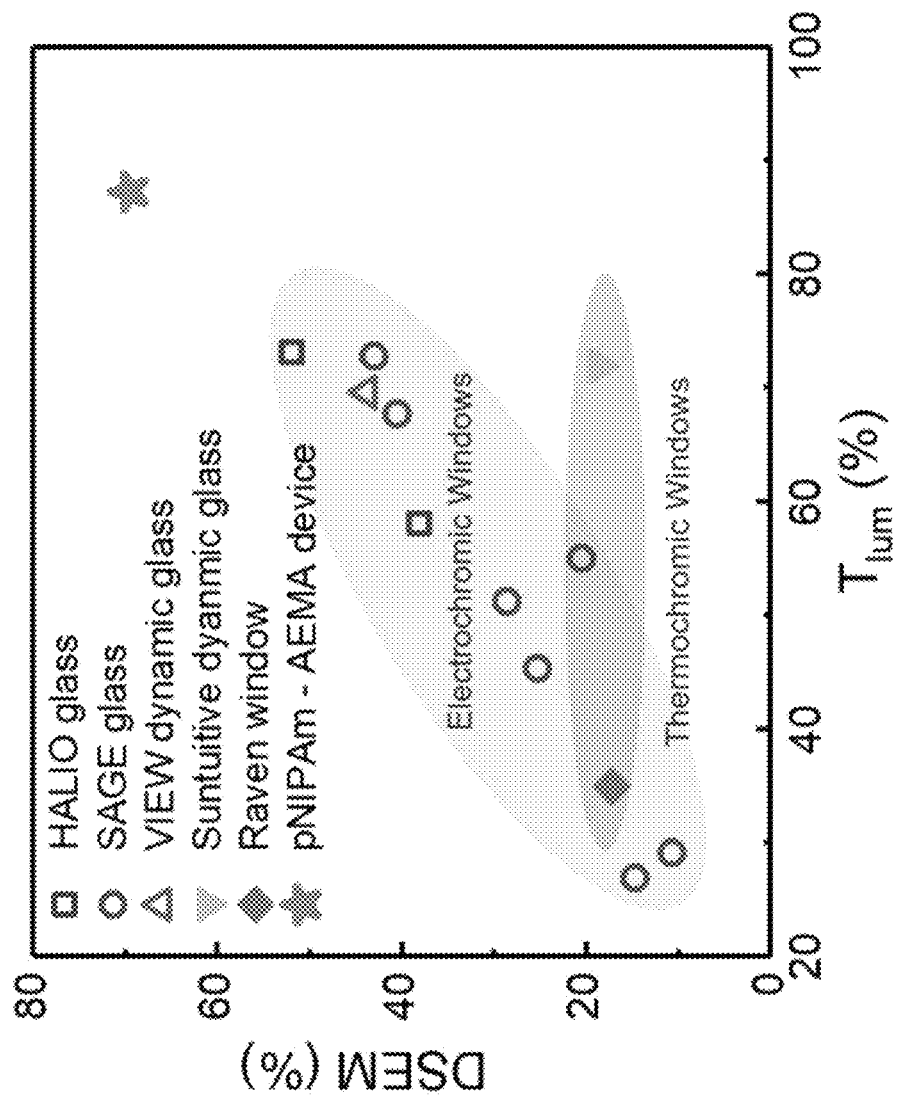

FIG. 10 graphically depicts a comparison of direct solar-energy modulation (DSEM) and luminous transmittance (Tlum) between the pNIPAm-AEMA device with available smart dynamic windows on the market.

FIGS. 11A-D illustrate solar-energy shielding performance of the pNIPAm-AEMA device.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

A new group of thermochromic materials composed of poly (N-isopropylacrylamide) (pNIPAm) hydrogel is the focus of the present invention. These novel thermochromic devices undergo phase transition at relatively low temperature ~32° C., indicating the potential to be an alternative form for smart windows. However, the pNIPAm hydrogel thin film barely affords the transmittance modulation in the IR region (780-2500 nm) where the thermal radiation contributes 53% in the total solar energy (ultraviolet 3%; visible 44%), which meanwhile suffers a severe stability problem due to the film shrinkage and the loss of reversibility. To overcome the challenges of existing electrochromic and thermochromic devices, a new thermochromic device is proposed using poly (N-isopropylacrylamide) (pNIPAm) and 2-Aminoethylmethacrylate hydrochloride (AEMA) co-polymerized pNIPAm-AEMA hydrogel microparticles. In this system, light management is conducted via the tunable scattering behaviors that rely on the change of the real part of the refractive index. The light blocking mechanism is elucidated with Mie scattering theory, which predicts efficient scattering in a broad solar spectrum with the aid of co-polymerized hydrogel microparticles of prescribed diameters. The cross-link density and size of the pNIPAm-AEMA particles are also manipulated experimentally to attain excellent performance in both $\Delta T_{solar}$ and $T_{lum}$, which is unachievable by any thermochromic counterparts. Notably, heating-cooling cycles demonstrate the excellent stability of the device.

Figure 1:
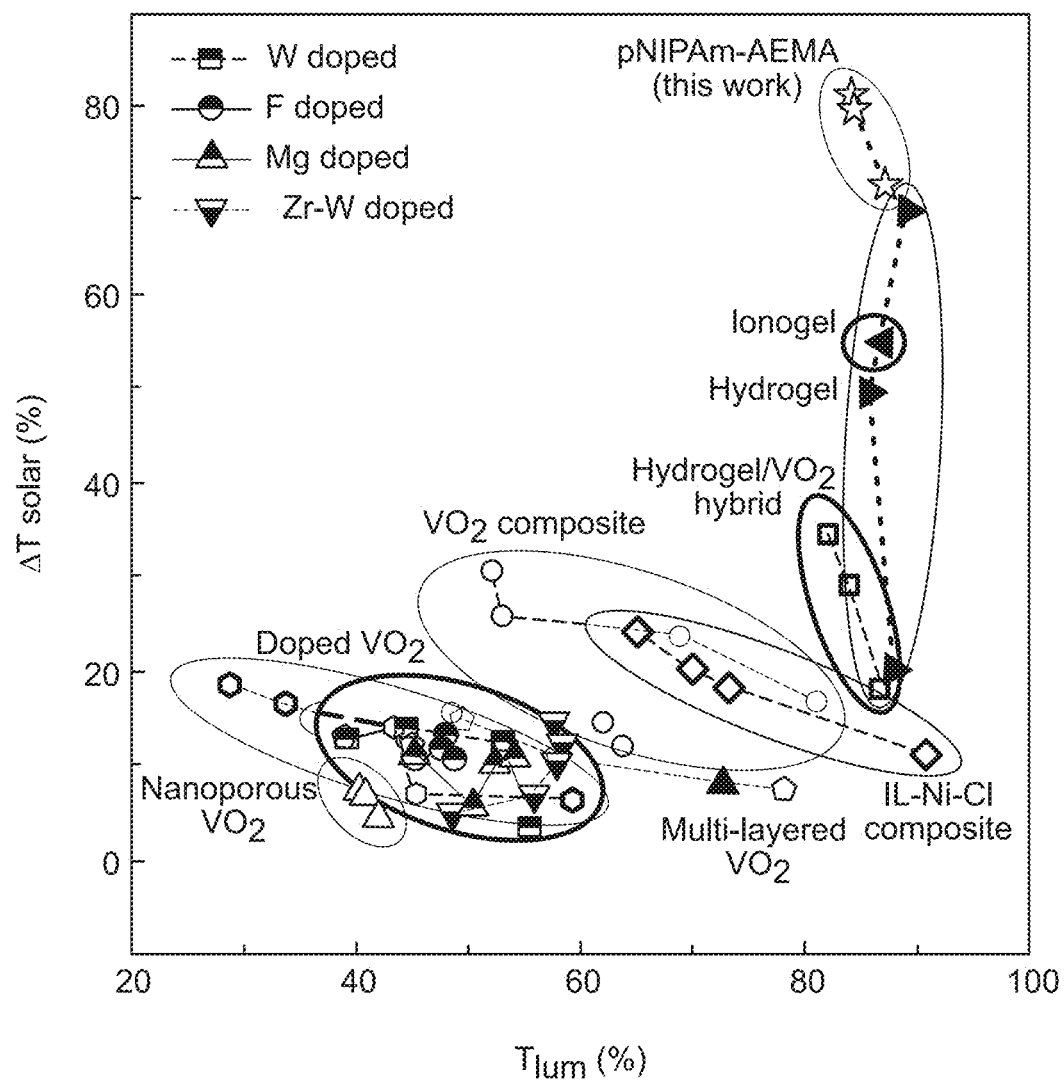
FIG. 1 illustrates a graph showing thermochromic performance in some of the best reported films including the pNIPAm-AEMA films of the present invention.

FIG. 1 depicts a graph showing thermochromic performance (solar transmittance modulation, $\Delta T_{solar}$, after phase transition, and luminous transmittance, $T_{lum}$, before phase transition) in some of the best reported films: single-layered $VO_2$ films, multi-layered $VO_2$ films, doped $VO_2$ films, nanoporous $VO_2$ films, $VO_2$ composite films, $VO_2$/nickel (II)-based ligand exchange hybrid (NLET) films, hydrogel films, hydrogel/$VO_2$ composite films, Si/Al hydrogel hybrid films, ionogel films, ferrocene modified ethylene glycol-modified pillar[6]arene (Fc-gel EGP6), ligand exchange of thermochromic films (LETC), and the pNIPAm-AEMA films of the present invention. Hollow and half-hollow symbols indicate the $\Delta T_{solar}$ of thermochromic films at phase transition temperature from 60° C. to 100° C. Solid symbols indicate the thermochromic films with low phase transition temperature (≤40° C.). In particular, the $\Delta T_{solar}$ of hydrogels, ionogels, LETC, and Fc-gel EGP6 are acquired at the phase transition temperature of 40° C., while, the $\Delta T_{solar}$ of the pNIPAm-AEMA films are obtained at 34° C. for the present invention.

Figure 2:
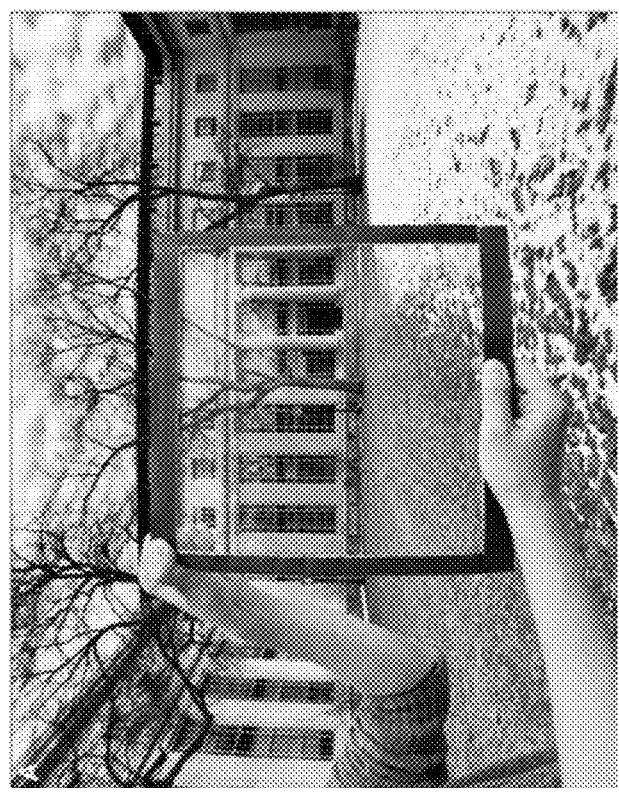
FIG. 2 illustrates an image of a 12"×12" pNIPAm-AEMA device after phase transition.

Furthermore, the solution-phase synthesis described herein permits an industrial-scale and cost-effective production, where a 12"×12" window device is fabricated to display its scalability and prospect of practical applications. FIG. 2 depicts an image of a 12"×12" pNIPAm-AEMA device after phase transition.

The Synthesis of Co-Polymerized pNIPAm-AEMA Microparticles

The uniqueness of pNIPAm particles for light management is that their optical properties can be tuned profoundly with the size, internal structure and volume fraction of water. Meanwhile, the pNIPAm particles display a fully reversible transition between hydrophilic and hydrophobic states at a lower critical solution temperature (LCST)~32° C. Such a LCST allows the phase transition to occur under solar irradiance. In contrast, to spontaneously trigger the phase transition of $VO_2$ under a natural convection and solar irradiance, an outdoor temperature higher than 50° C. is required, which is practically infeasible. At swollen state, the pNIPAm particles with homogeneous cross-link density and water-rich structure contribute to a much higher $T_{lum}$ compared with $VO_2$. The mismatch of refractive index between pNIPAm particles and surrounding water is established when the polymer network collapses above LCST, and the light is regulated via strong scattering occurring at the dense polymer core.

FIGS. $3A_1$-$A_2$, $B_1$-$B_3$, C, and $D_1$-$D_4$ illustrate temperature-responsive pNIPAm-AEMA microparticles.

FIGS. $3A_1$-$A_2$ depict a schematic of transmittance modulation based on the tunable scattering behaviors of hydrogel particles.

FIG. $3B_1$ depicts light manipulation with the aid of the phase transition of pNIPAm particles produced by one-pot synthesis. FIG. $3B_2$ depicts pNIPAm particles synthesized by the continuous feeding method. FIG. $3B_3$ depicts pNIPAm-AEMA co-polymerized microparticles.

For one-pot synthesis, the NIPAm monomer, BIS cross-linker are dissolved in distilled water in prior to the polymerization. The mixture is heated up to ~80° C. under a stream of $N_2$ and the polymerization is initiated by adding APS solution. Thus, classical one-pot synthesis leads to the heterogeneous internal structure of pNIPAm particles and high polydispersity.

On the other hand, in continuous feeding method, two batches of the mixture of NIPAm monomer and BIS cross-linker are added at different stages. DI water is heated to 80° C. and purged with $N_2$ during the entire reaction. The first-batch solution is injected into the reaction vessel directly, while the second-batch solution is transferred into a syringe. Whereafter, the polymerization is initiated by adding APS solution, meanwhile, SDS surfactant is added to prevent aggregation during the polymerization. After one minute, the second-batch solution is fed into the reaction vessel by a syringe pump at a constant rate, so that the reaction rate could be finely controlled.

For the co-polymerized microparticles, the synthesis procedures are basically the same to the aforementioned continuous feeding method, especially, AEMA is introduced into two batches of monomer mixtures, which modifies the surface charge of particles with the positive terminal primary amine group in order to increase the size of hydrogel particles. Visible light and IR light are presented by solid and dotted arrows, respectively.

FIG. 3C depicts hydrodynamic diameters (in nm) of pNIPAm-AEMA microparticles (solid lines) and pNIPAm particles (dashed lines) at different temperatures.

FIGS. $3D_1$ and $3D_2$ depict Real (n) and imaginary (k) refractive index of the pNIPAm-AEMA microparticles at 25° C. and 35° C., respectively. The dashed line in $D_1$ shows the n of water.

FIGS. $3D_3$ and $3D_4$ depict corresponding scattering and absorbing cross-sections of the pNIPAm-AEMA microparticles at 25° C. and 35° C., respectively. Estimated scattering cross-sections of pNIPAm-AEMA with a diameter of 400 nm, 800 nm and 1000 nm at the de-swollen state are illustrated as solid curves.

Generally, pNIPAm particles synthesized by radical emulsion polymerization have a size parameter ($2\pi/\lambda$) comparable to 1 in the visible region, and the Mie theory governs the scattering behavior. Nevertheless, the size limitation leads to inefficient scattering in the IR region, which accounts for 53% of the total solar energy. Therefore, the present invention's design strategy is to extend the scattering and transmittance modulation from the visible to IR region by means of increasing the particle size.

Heterogeneous internal structure of pNIPAm particles is normally produced in the classical one-pot synthesis, inducing high turbidity of the pNIPAm suspension at room temperature (see FIG. $3A_1$). To enlarge particles without compromising $T_{lum}$, the continuous feeding method was applied in this work, which kept a constant monomer concentration and a reaction rate throughout the entire synthesis. The hydrogel particles were formed with a homogenous cross-link structure, contributing to a very low scattering contrast to surrounding water at the swollen state (see FIG. $3A_2$). The average hydrodynamic diameter ($D_h$) of pure pNIPAm particles is 548 nm at 25° C. and shrinks to 282 nm at 35° C. (see FIG. 3C), which reaches its size limitation in spite of carrying out the polymerization in a longer period of time and with a larger amount of monomer (see FIG. 4), leading to an inefficient scattering in the IR region.

FIG. 4 depicts the size limitation of pNIPAm particles synthesized by continuous feeding method. Hydrodynamic diameters of pNIPAm particles synthesized by continuous feeding for 143 minutes (dash box) and 286 minutes (solid box) as a function of temperature. To carry out the polymerization for a longer time and a larger amount of monomers (100% increment). There is only 26% increase of $D_h$ at 25° C. and 1.3% increase at 35° C.

In order to extend light management range, the AEMA was introduced to increase the particle size by co-polymerization, which was gradually added into the growing chains of pNIPAm (see, for example, FIG. 5C).

FIGS. 5A-B depict optical microscope images of the pNIPAm-AEMA microparticles synthesized by continuous feeding for 75 minutes. FIG. 5A depicts pNIPAm-AEMA microparticles before phase transition, wherein $D_h$ is 1388 nm at 25° C. (scale bar is 5 m). FIG. 5B depicts pNIPAm-AEMA microparticles after phase transition, wherein $D_h$ reduces to 546 nm at 35° C. (scale bar is 5 m).

FIG. 5C depicts hydrodynamic diameter of the co-polymerized pNIPAm-AEMA particles at 25° C. To keep a constant co-monomer concentration for injection, the pNIPAm-AEMA particles grow linearly in dimension with the increasing of feeding time.

The surface charge of hydrogel particles was modified by the positive terminal primary amine groups in AEMA. The electrostatic repulsion of the hydrogel particles was diminished, which can be corroborated by the change of the zeta potential from −23.9 mV to −9.0 mV. The oligomers precipitated on primary particles and consequently to increase the particle size. The $D_h$ enlarges to 1388 nm at 25° C. (see FIG. 5A) and 546 nm at 35° C. (see FIG. 5B), contributing to a size parameter ($2\pi/\lambda$) comparable to 1 in the IR region. Meanwhile, a homogeneous cross-link density of particles and a strong temperature-responsive property (LCST~32° C.) are maintained. Furthermore, a controllable size of pNIPAm-AEMA particles is achieved from around 200 to 2000 nm by co-polymerization (see FIG. 5C). Microparticles at swollen and de-swollen states were identified with optical microscopy (see FIGS. 5A and 5B). Compared with the synthesis and thin-film manufacture of thermochromic $VO_2$, such a solution-phase synthesis of co-polymerized hydrogel particles suggests excellent potential for industrial-scale and cost-effective production.

Scattering Behavior of pNIPAm-AEMA Microparticles

The scattering behaviors of a particle can be controlled by designing the internal structure, and the match/mismatch of optical properties with the surroundings. For instance, invisibility cloaking and superscattering are realized using either core-shell structure or layer structure of a scatter. Tunable scattering behaviors of pNIPAm-AEMA microparticles herein are implemented in terms of the internal structure and the size parameter, in which Mie theory and Beer-Lambert law were applied to investigate the scattering cross-section. FIGS. $3D_1$ and $3D_2$ show the complex refractive index of pNIPAm-AEMA microparticles, which was deduced from the attenuation coefficient ($\mu_t$) of the diluted suspension. The n of particles closes to the n of water at the swollen state, which is attributed to the large volume fraction of water and a homogeneous cross-linked structure. The small scattering cross-section ($\sigma_s$) before phase transition is beneficial for a high $T_{lum}$ (FIG. $3D_3$). Meanwhile, the small absorbing cross-section ($\sigma_a$) indicates a low absorption loss in the pNIPAm-AEMA (FIG. $3D_4$), where two peaks near 1450 nm and 1930 nm are associated with the absorption of water molecules (see FIGS. 6A and 6B).

FIGS. 6A-B depict attenuation coefficient of hydrogel particle suspension. FIG. 6A depicts a graph showing the attenuation coefficient of the pNIPAm-AEMA microparticle suspension, obtained from suspension with thicknesses of 130 μm, 320 μm, 470 μm and 620 μm. FIG. 6B depicts a graph showing the attenuation coefficient of the pNIPAm particle suspension, obtained from suspension with thicknesses of 130 μm, 300 μm, 460 μm and 670 μm. Error bars represent the 95% confidence intervals of fitted attenuation coefficients. As noted earlier, the two peaks near 1450 nm and 1930 nm are associated with the strong absorption of water molecules.

After the phase transition, the internal structure of pNIPAm-AEMA microparticles changes from homogeneously water-rich state to the collapsed state. The n approaches that of the bulk polymer with the reduction in the volume fraction of water. The n of pNIPAm-AEMA at the de-swollen state increases to approximately 1.45 in the visible region and to 1.40 in the IR region, which is in good accordance with the n of hydrogel particles with similar chemical structures estimated by the effective medium approximation. FIG. $3D_3$ depicts that the $\sigma_s$ of pNIPAm-AEMA appreciably increases in both the visible and IR regions after the phase transition. In contrast, the as of pure pNIPAm particles in the IR region is 2 orders lower due to the limitation of the particle size, which narrows the transmittance modulation region. The estimation of as in terms of different particle sizes is also investigated (see FIG. $3D_3$), indicating that the enlargement of particle size is responsible for delivering a stronger scattering in the broad solar spectrum. On the other hand, the $\sigma_a$ of pNIPAm-AEMA microparticles keeps a similar value (see FIG. $3D_4$), indicating that the transmittance is modulated via the enhancement of scattering, with respect to increases in the real part of the refractive index, instead of absorbing.

Transmittance Modulation by pNIPAm-AEMA Hydrogel Devices

To fulfill efficient light management for energy saving purposes, the ideal thermochromic smart window requires a near room-temperature transition and a sharp gradient of transmittance. The pNIPAm-AEMA hydrogel device satisfies these claims with a large $\Delta T_{solar}$ at a LCST~ 32° C. The transmittance spectra (250-2500 nm) at the layer thickness of 240 μm is reported in FIG. 7A. At temperatures below LCST (22° C. or 25° C.), the $T_{lum}$, $T_{IR}$ and $T_{solar}$ are as high as 87.2%, 81.6% and 84.1%, respectively (see FIG. 7B). FIG. 7B shows luminous ($\Delta T_{lum}$), IR ($\Delta T_{IR}$) and solar ($\Delta T_{solar}$) transmittance modulations at different temperatures. The transmittance modulations were initiated at 31° C. along with a $\Delta T_{solar}$ of 26.2%, implying a strong temperature-responsive nature of pNIPAm-AEMA microparticles. Meanwhile, the phase transition occurred at a narrow temperature window from 31° C. to 34° C. Such quick transition is desired for promptly blocking large amount of solar irradiance. Notably, the $T_{IR}$ was significantly reduced from 81.6% at 25° C. to 6.0% at 34° C., indicating an unprecedented high $\Delta T_{IR}$ of 75.6%. As a result, the $\Delta T_{solar}$ was boosted to 81.3%. In contrast, pure pNIPAm particles with the small size ($D_h$=548 nm at 25° C. and 282 nm at 35° C.) barely afforded transmittance modulation in the IR region (see FIG. 3C). The pNIPAm hydrogel layer with the same thickness (240 μm) only showed a low $\Delta T_{IR}$ of 32.1%, leading to a limited $\Delta T_{solar}$ of 59.1% (FIG. 3C). Although a hybrid of hydrogel with $VO_2$ or antimony-tin oxide nanoparticles has been attempted to improve $\Delta T_{IR}$, the operating temperature of metal oxide nanoparticle/hydrogel composite is as high as 80° C. Also, the complicated fabrication procedures for both nanoparticle doping and composite preparation cause difficulties for practical application. Furthermore, the performance of the pNIPAm-AEMA hydrogel device regarding transmittance modulations is superior to all known $VO_2$-based thermochromic materials and thermochromic films made by hydrogels, hydrogel/$VO_2$ composites and ionogels.

Figure 8A:
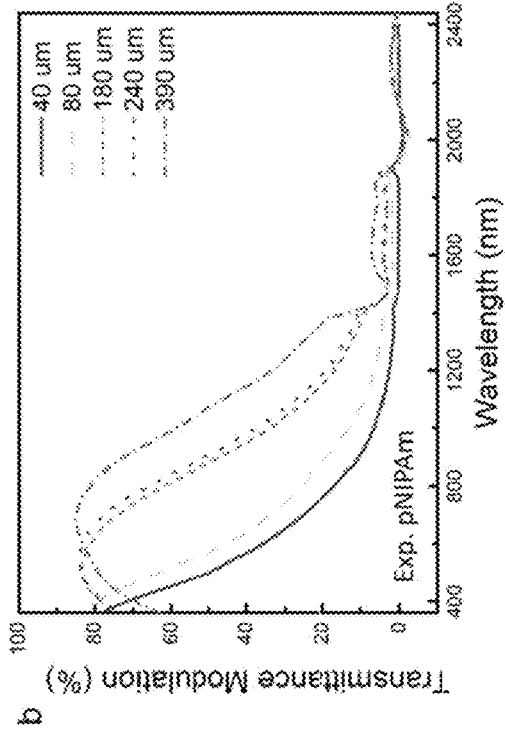
Figure 8B:
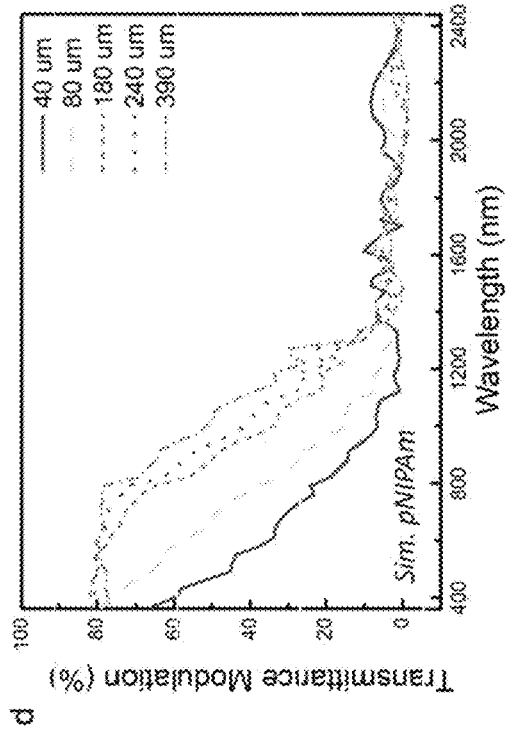
Figure 8C:
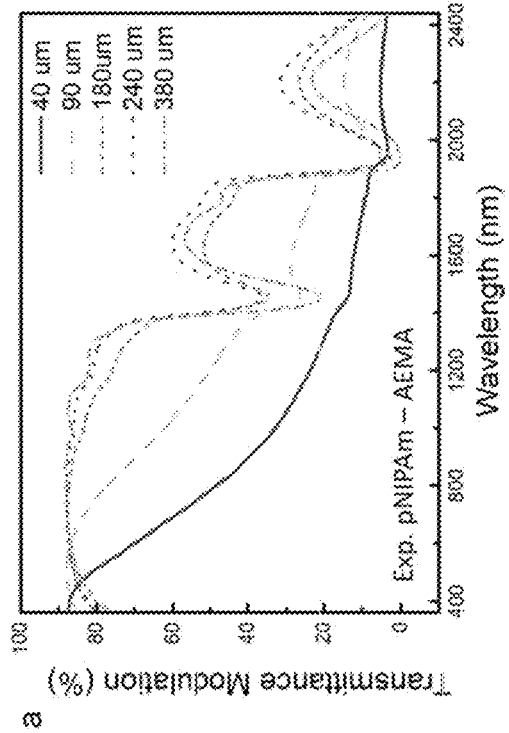
Figure 8D:
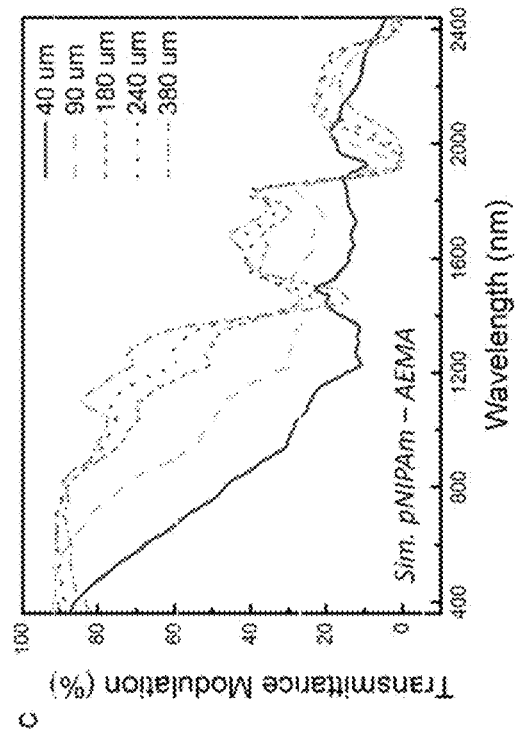

The excellent light blocking by pNIPAm-AEMA hydrogel device in the IR spectrum results from the microparticles whose dimensionless size parameter ($2\pi/\lambda$) reaches to unity in the IR region. The IR light is effectively scattered by microparticles in the device with the layer thickness from thin (40 μm) to thick (380 μm) (see FIG. 8A). To the contrary, the transmittance modulation of pNIAm particles is confined in the visible spectrum and is hardly improved by increasing the layer thickness (FIG. 8B).

FIGS. 8A-D illustrates transmittance modulation by pNIPAm-AEMA and pNIPAm hydrogel with different layer thicknesses. Experimental (FIGS. 8A and 8B) and the Monte-Carlo simulation (FIGS. 8C and 8D) results of transmittance modulation (T25° C.-T35° C.) by pNIPAm-AEMA microparticles with the layer thickness from 40 to 380 m, and pNIPAm particles with the layer thickness from 40 to 390 m. Large absorption of UV light by the double glass slides at the wavelength range below 360 nm causes the deviation between experiments and simulations, which is excluded in the figure. This deviation is negligible for the estimation of the solar modulation due to the small portion of solar irradiance in the UV region.

A Monte-Carlo simulation of multiple scattering process based on Mie theory was applied to investigate the dependence of $\Delta T_{solar}$ on the layer thickness. The experiment results of transmittance modulation at different layer thicknesses were well reproduced, in which the estimated n and k of hydrogel particles were adopted (See FIGS. 8A-D). Owing to the broadband transmittance modulation, $\Delta T_{solar}$ of pNIPAm-AEMA hydrogel is higher than $\Delta T_{solar}$ of pNIPAm hydrogel for any given layer thickness (FIG. 9A). Meanwhile, the simulation shows the potential of pNIPAm-AEMA hydrogel to achieve a high $T_{lum}$ and keep a decent $\Delta T_{solar}$ after phase transition by further reducing the layer thickness (FIG. 9B).

FIGS. 9A-B depict graphs showing thickness-dependent thermochromic properties of pNIPAm-AEMA and pNIPAm hydrogel. FIG. 9A depicts a graph showing the dependence of $\Delta T_{solar}$ on the layer thickness of the pNIPAm-AEMA and the pNIPAm hydrogel, obtained from the experiment and the Monte-Carlo simulation. FIG. 9B depicts a graph showing $\Delta T_{solar}$ and $T_{lum}$ at 35° C. (after phase transition) of the pNIPAm-AEMA hydrogel and the pNIPAm hydrogel with the layer thickness from 10 to 50 m, obtained from the Monte-Carlo simulation.

Solar-Energy Shielding and Device Stability

Practical applications of smart windows raise the claims of reducing the solar gain and maintaining stability. To evaluate the solar energy shielding ability, a direct solar-energy modulation (DSEM) was introduced, which characterizes the reduction of the heat flux from solar irradiance due to the phase transition of the window device. The irradiance from a solar simulator was slashed by 69.5% after passing through a pNIPAm-AEMA device, which is significantly higher than all existing smart window product on the market (FIG. 10).

FIG. 10 graphically depicts a comparison of direct solar-energy modulation (DSEM) and luminous transmittance ($T_{lum}$) between the pNIPAm-AEMA device with available smart dynamic windows on the market. Solid symbols represent thermochromic windows, while hollow symbols represent electrochromic windows.

Figure 11A:
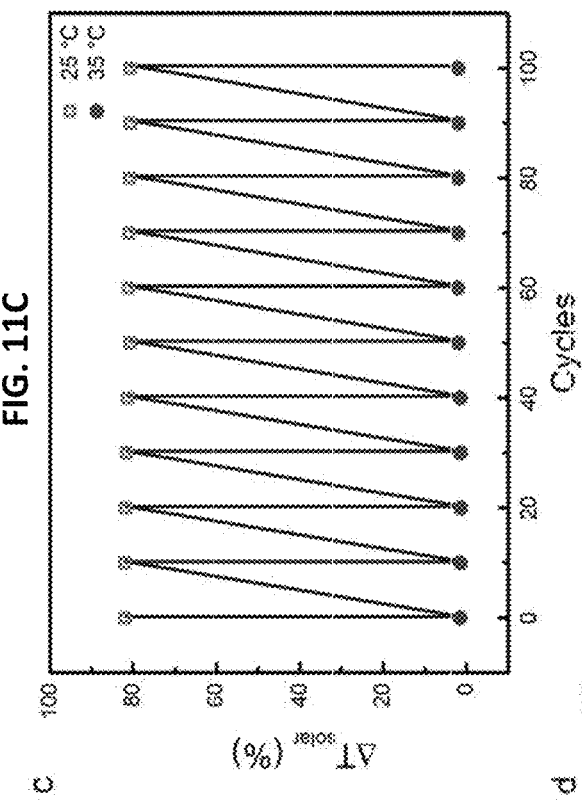
Figure 11B:
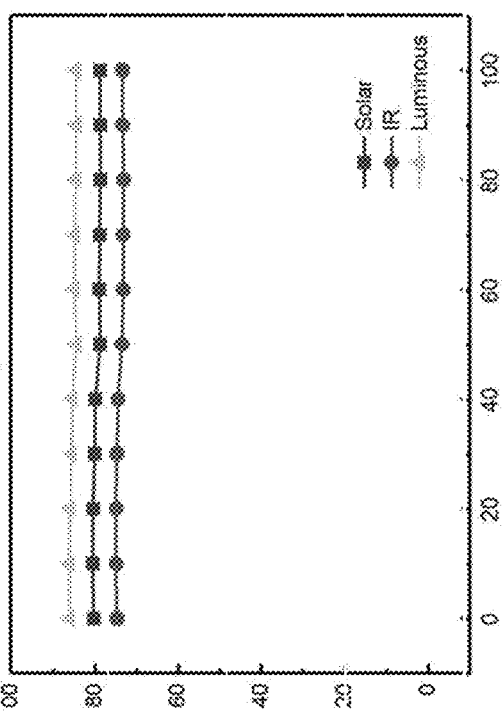
Figure 11C:
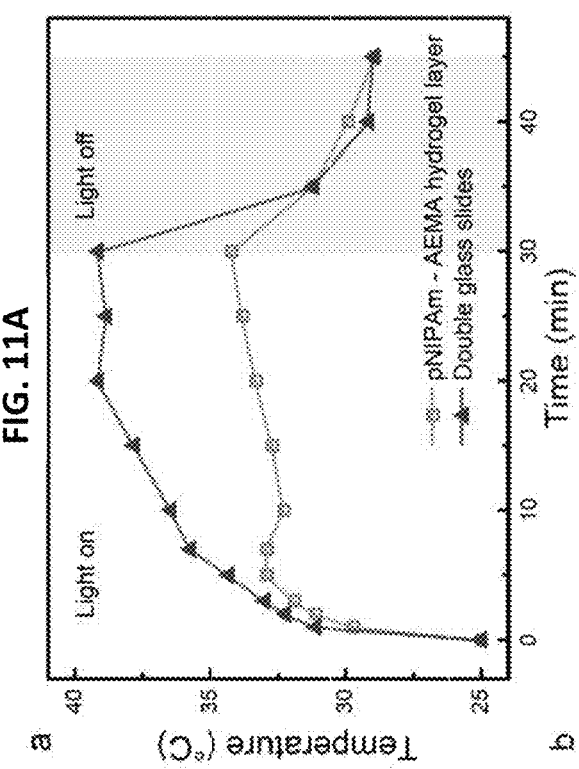
Figure 11D:
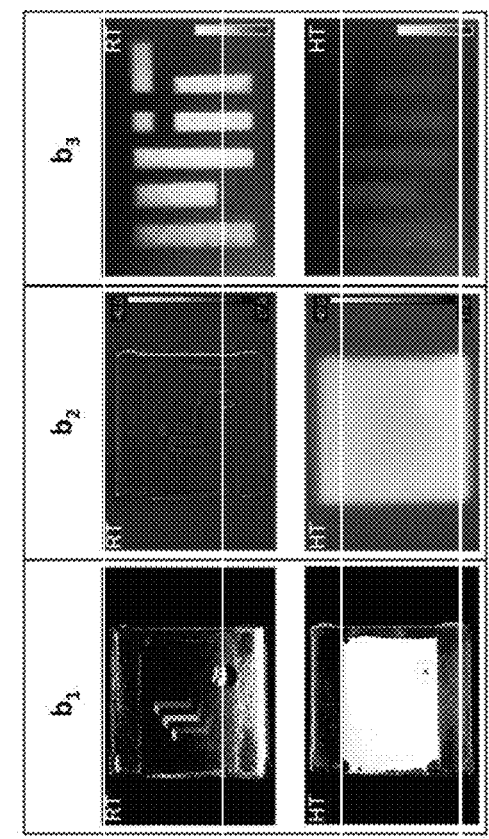

FIGS. 11A-D illustrate solar-energy shielding performance of the pNIPAm-AEMA device. FIG. 11A illustrates temperature profiles of a thermometer inside the model chamber affixed with double glass slides or a pNIPAm-AEMA device as the window. In FIG. 11B, $B_1$-$B_2$ refer to visible images and corresponding thermal infrared images of a 2"×2" pNIPAm-AEMA device before and after phase transition. $B_3$ refers to IR images of a pNIPAm-AEMA device under illumination of a NIR source (850-2000 nm) captured by an IR camera. FIG. 11C illustrates a graph of the solar transmittance ($T_{solar}$) and FIG. 11D illustrates transmittance modulations ($\Delta T_{lum}$, $\Delta T_{IR}$, and $\Delta T_{solar}$) of the pNIPAm-AEMA device (380 μm layer thickness), both measured after every 100 heating-cooling cycles.

The pNIPAm-AEMA device was also installed on a chamber, and the temperature change inside the chamber was recorded under 1 sun, air mass 1.5 illumination (FIG. 11A). The window made by double glass slides was used as a control experiment, where the initial temperature of 25.0° C. rapidly increased to 39.1° C. after 20 minutes and reached a plateau at 30 minutes (14.1° C. increments). Whereas, the phase transition of the pNIPAm-AEMA device was spontaneously triggered after 5 minutes illumination and the inner temperature only increased by 9.2° C. at 30 minutes. Notably, the inner temperature raised merely 1.3° C. once the phase transition of the pNIPAm-AEMA hydrogel was completed. A slight decline in temperature after the phase transition indicates a net negative heat gain inside the chamber induced by a sudden opacity change where the heat dissipation was more significant than the heat input from illumination. After 10 minutes illumination, the outside temperature reached 40.9° C., and the inside temperature increased gradually due to heat conduction and convection. A smaller temperature rising rate of 0.10° C./min was delivered, compared to the rising rate of 0.26° C./min when the double glass window was used.

In FIG. 11B, $B_1$ demonstrates visible transparency of the pNIPAm-AEMA device before and after phase transition, and $B_2$ shows the corresponding thermal infrared images. The pNIPAm-AEMA device became opaque when the temperature raised to 35° C. Especially, the outstanding IR modulation of pNIPAm-AEMA device was proved by IR images (i.e., $B_3$). At 25° C., the NIR light (850-2200 nm) passed through an "MIT" logo and was captured by IR camera, whose intensity was significantly slashed once the phase transition was triggered, indicating an excellent $\Delta T_{IR}$, which is barely obtained by $VO_2$ thin films and other kinds of thermochromic thin films.

A heating-cooling test of 100 cycles was conducted on the pNIPAm-AEMA device to test its stability for long-term operation, which shows less than a 1% decrease in transmittance modulations (FIGS. 11C and 11D) and a non-detectable shrinkage of the hydrogel film. Such high stability regarding the number of testing cycles has not yet been reported as most smart windows made by hydrogels suffer the severe and non-reversible deformation after cyclic tests.

In summary, a new type of light management device based on thermochromic pNIPAm-AEMA microparticles has been demonstrated. The large and broadband transmittance modulation makes the device preferable for efficient energy-saving. Especially, by tailoring the particle size and internal structure, the pNIPAm-AEMA hydrogel effectively extends light blocking into the IR region, contributing to a significantly enhanced $\Delta T_{IR}$ of 75.6% and an ultra-high $\Delta T_{solar}$ of 81.3%. Meanwhile, the superiorities of hydrogel over conventional V02-based thermochromic materials are maintained, exhibiting a high $T_{lum}$ of 87.2% and a low phase transition temperature ~32° C. The decline of indoor temperature ~5° C. can be expected by using the pNIPAm-AEMA thermochromic windows, whose excellent stability and scalability also display its great prospect of practical applications. Inspired by the advancement of pNIPAm-AEMA microparticles in light management over counterpart thermochromic materials, future progress in dynamic transmittance modulation is enabled by pursuing optimized mechanisms (e.g., adsorption, reflection, scattering) that lead to changes in the refractive index. The tunable scattering behaviors of hydrogel particles not only exploit a way for the renovation of energy-saving smart windows but also are broadly applicable to optical modulators, displays and invisibility cloaking.

Experimental Section

Materials

The N-Isopropylacrylamide monomer (NIPAm, 98%), N,N'-methylenebis (acrylamide) (BIS, 99%) cross-linker, ammonium persulfate (APS, ≥98%) initiator, sodium dodecyl sulfate (SDS, ≥98.5%) surfactant were purchased from Sigma-Aldrich. 2-Aminoethylmethacrylate hydrochloride monomer (AEMA, 95%) was purchased from Polysciences. All reagents were used as received without any further purification, and the solutions were prepared with deionized water (18.2 MΩ).

Synthesis of pNIPAm-AEMA Microparticles

The pNIPAm-AEMA particles were synthesized by the continuous feeding of NIPAm and AEMA co-monomers into the reaction vessel. The dimension of pNIPAm particles can be finely tuned by controlling the feeding time during the co-polymerization. 6.00 g NIPAm, 0.15 g BIS and 25.8 mg AEMA were dissolved in 150 ml DI water and purged with $N_2$ for 20 minutes. The one-fifth as-prepared solution was mixed with 60 ml DI water and heated to 80° C. with $N_2$ purging throughout the synthesis, while the remained solution was then filled into a syringe. To initiate the polymerization, 6 ml of 22.8 mM APS was added to the reaction vessel. The reaction mixture turned to turbid after 5 min. The remaining solution was continuously fed into the reaction vessel at a rate of 1 ml/min, and the solution was stirred intensively at 500 rpm during the entire polymerization. The reaction was stopped after 75 minutes, and the colloidal suspension was quenched rapidly in a freezer for 1.5 hours. To improve the stability of colloid suspensions, 0.87 mM SDS surfactant was dissolved in the colloid suspension by ultrasonication, and the temperature of the suspension was kept below 30° C. The size of co-polymerized pNIPAm-AEMA particles was controlled by continuously feeding a constant concentration of co-monomers and predictably stopping the reaction at different feeding times. The pure pNIPAm hydrogel particles were synthesized similarly (Supplementary Note 3).

Device Fabrication

Before the fabrication of window devices, the pNIPAm-AEMA microparticles suspension was centrifuged at 13,000 rpm for 1.5 hours (MiniSpin plus, Eppendorf, Germany), and followed by a rapid cooling procedure. The close-packed pNIPAm-AEMA particles effectively reduce the scattering occurring at the interface between water and hydrogel particles at the swollen state, generating a highly transparent hydrogel compared to the colloid suspension. The hydrogel thin-film devices were fabricated by injecting pNIPAm-AEMA or pNIPAm hydrogel particles in between double glass slides, acrylic substrates, and polyethylene terephthalate (PET) substrates, in which the thickness of the layer was precisely controlled by using thermoplastic sealing films (Meltonix 1170, DuPont Surlyn).

Characterization

Dynamic light scattering (DLS) measurements were performed on a Dynamic Nanostar (Wyatt Technology, USA) with a laser at the wavelength of 658 nm. The diffusion coefficient (D) was obtained from the measured autocorrelation function (ACF), by which the hydrodynamic diameter ($D_h$) of a diffusion sphere was determined via the Stokes-Einstein equation (1):

$$D_h = \frac{kT}{3\pi\eta D} \quad (1)$$

where k is Boltzmann's constant, T is the absolute temperature, q is the viscosity of the solvent. The hydrogel suspensions were diluted to 50 ppm and injected into UV/Vis cuvettes (Eppendorf International) for DLS measurements. The temperature was controlled by a thermostat with an accuracy of ±0.1° C.

The transmittance spectra were collected using a Lambda 1050 UV-Vis-NIR spectrophotometer (PerkinElmer, USA) at normal incidence. Thermochromic responses were controlled by applying Kapton insulated flexible heaters upon the device. The calculations of integral luminous transmittance $T_{lum}$ (380-780 nm), IR transmittance $T_{IR}$ (780-2500 nm), solar transmittance $T_{solar}$ (280-2500 nm) and corresponding transmittance modulations can be found in equation (2) and (3), respectively:

$$T_{lum/IR/solar} = \frac{\int \varphi_{lum/IR/soalr}(\lambda)T(\lambda)d\lambda}{\int \varphi_{lum/IR/soalr}(\lambda)d\lambda} \quad (2)$$

$$\Delta T_{lum/IR/solar} = T_{lum/IR/solar}(@LT) - T_{lum/IR/solar}(@HT) \quad (3)$$

where T(λ) denotes the recorded transmittance at a particular wavelength, $\varphi_{lum}$ is the standard luminous efficiency function for the photopic vision of human eyes, and $\varphi_{IR/solar}$ is the IR/solar irradiance spectrum for air mass 1.5.

The solar-energy shielding test was conducted on a model chamber with a dimension of 0.15×0.10×0.08 m³, which was covered by rigid melamine insulation sheets. The 0.04× 0.05 m² window devices made by bare double glass slides or the hydrogel device with a layer thickness of 380 m were assembled upon the model chamber, which were tested under illumination from a standard solar simulator (Peccell PEC-L01, Japan). The intensity of the light source was calibrated to simulate air mass 1.5 illumination (100 mWcm⁻²) on the top side of the window. The temperatures inside and outside of the chamber were measured by a thermometer simultaneously. Additionally, the infrared thermal images of the smart window before and after phase change were recorded via a FLIR C3 thermal imaging camera (FLIR Systems, USA). A near-infrared (NIR) bulb incorporated with a long pass filter (850-2200 nm, Throlab FEL0850) was utilized as the irradiation light source for the demonstration of IR modulation. The IR images were captured by an IR camera (IR camera 85400, FJW Optical System, USA) with the sensitivity from 400 to 1800 nm.

Evaluation of Optical Properties of Hydrogel Particles

The scattering cross-sections of the hydrogel particles before and after phase transition were evaluated with an inverse method based on Mie theory. On the basis of Beer-Lambert law, the attenuation coefficient ($\mu_t$) of a low-concentration particle suspension could be obtained by determining the linear dependence of ln(T) on the thickness of suspension (d), $$\mu_t(\lambda) = -\frac{\Delta \ln[T(\lambda)]}{\Delta d} \quad (4)$$

The attenuation coefficient is determined by scattering and absorbing, $$\mu_t(\lambda) = \mu_s(\lambda) + \mu_a(\lambda) \quad (5)$$

$$\mu_s = c\sigma_s \quad (6)$$

$$\mu_a = c\sigma_a + \frac{4\pi k_w}{\lambda} \quad (7)$$

where $\mu_s$ and $\mu_a$ are the scattering and absorbing coefficient, respectively. Besides, as and $\sigma_a$ denote the scattering and absorbing cross-section, respectively. c is the concentration of particles and $k_w$ is the imaginary refractive index of water. The transmittance of the hydrogel suspensions was diluted to 10 wt % from the as-synthesized suspensions. The diluted suspensions with the thickness from 130 μm to 670 μm were measured to determine the attenuation coefficient. An assumption was made that the particles at swollen state are incompressible. The concentration of the hydrogel particles was estimated by measuring the volume of particles after removing the surrounding water via centrifuging and dividing by $\frac{1}{6}\pi D_h^3$. The scattering and absorbing cross-sections of hydrogel particles were calculated based on a modified Mie scattering code. Through systematically varying the input refractive index, the cross-sections associated with the experimentally measured attenuation coefficient were enumerated. The absorption of water molecules in the IR region would introduce fluctuations in determining the attenuation coefficient and the refractive index. Here the fitted refractive index was chosen to keep the continuity of the real part (n) through both the visible and IR regions and to achieve a relative error less than 1% between the fitted and measured attenuation coefficients. Stepsize of $10^{-4}$ in n and $10^{-6}$ in the imaginary refractive index (k) for the visible region and $10^{-5}$ for the IR region were used in the fitting. To corroborate the effectiveness of increasing particle size on enhancing scattering in the IR region, $\sigma_s$ of hydrogel microparticles with diameters of 400 nm, 800 nm and 1000 nm at the de-swollen state was estimated based on Mie theory incorporating with the complex refractive index of pNIPAm-AEMA hydrogel at 35° C.

CONCLUSION

A system and method have been shown in the above embodiments for synthesis and application of light management with thermochromic hydrogel microparticles. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A hydrogel thin-film device for use in light management, the device comprising:
   a layer comprising temperature-responsive hydrogel microparticles, wherein each of the temperature-responsive hydrogel microparticles (i) has a homogeneous cross-link density, and (ii) comprises poly (N-isopropylacrylamide)-2-Aminoethylmethacrylate hydrochloride (pNIPAm-AEMA),
   wherein the homogeneous cross-link density and pNIPAm-AEMA enable the hydrogel thin-film device to achieve a luminous transmittance over 85% at 25° C.;
   wherein solar gain is regulated in the device by tuning light scattering in the layer by controlling particle size of the pNIPAm-AEMA microparticles, and
   wherein an average size of the pNIPAm-AEMA microparticles varies from 1388 nm at 25° C. to 546 nm at 35° C.

2. The device of claim 1, wherein the temperature-responsive hydrogel microparticles can undergo a phase transition under solar irradiance due to the low critical solution temperature (LCST) of about 32° C.

3. The device of claim 1, wherein the infra-red (IR) transmittance modulation between 34° C. and 40° C. is over 70%.

4. The device of claim 3, wherein the IR transmittance modulation between 34° C. and 40° C. is 75.6%.

5. A hydrogel thin-film device for use in light management, the device comprising:
   a layer comprising temperature-responsive hydrogel microparticles, wherein each of the temperature-responsive hydrogel microparticles (i) has a homogeneous cross-link density, and (ii) comprises poly (N-isopropylacrylamide)-2-Aminoethylmethacrylate hydrochloride (pNIPAm-AEMA),
   wherein the homogeneous cross-link density and pNIPAm-AEMA enable the hydrogel thin-film device to achieve an infra-red (IR) transmittance reduction of at least 70% at temperatures above 34° C.;
   wherein solar gain is regulated in the device by tuning light scattering in the layer by controlling particle size of the pNIPAm-AEMA microparticles, and
   wherein an average size of the pNIPAm-AEMA microparticles varies from 1388 nm at 25° C. to 546 nm at 35° C.

6. The device of claim 5, wherein the temperature-responsive hydrogel microparticles can undergo a phase transition under solar irradiance due to the low critical solution temperature (LCST) of about 32° C.

7. The device of claim 5, wherein the infra-red (IR) transmittance modulation between 34° C. and 40° C. is over 70%.

8. The device of claim 7, wherein the IR transmittance modulation between 34° C. and 40° C. is 75.6%.

9. The device of claim 5, wherein the luminous transmittance of the device is over 85% at a phase transition temperature of about 32° C.

10. A hydrogel thin-film device for use in light management, the device comprising:
    a layer comprising temperature-responsive hydrogel microparticles, wherein each of the temperature-responsive hydrogel microparticles (i) has a homogeneous cross-link density, and (ii) comprises poly (N-isopropylacrylamide)-2-Aminoethylmethacrylate hydrochloride (pNIPAm-AEMA),
    wherein the homogeneous cross-link density and pNIPAm-AEMA enable the hydrogel thin-film device to achieve (i) a luminous transmittance over 85% at 25° C., and (ii) an IR transmittance reduction of at least 70% at temperatures above 34° C.;
    wherein solar gain is regulated in the device by tuning light scattering in the layer by controlling particle size of the pNIPAm-AEMA microparticles, and
    wherein the temperature-responsive hydrogel microparticles can undergo a phase transition under solar irradiance due to the low critical solution temperature (LCST) at 32° C., and
    wherein an average size of the pNIPAm-AEMA microparticles varies from 1388 nm at 25° C. to 546 nm at 35° C.

11. The device of claim 10, wherein the infra-red (IR) transmittance modulation between 34° C. and 40° C. is over 70%.

* * * * *